(12) United States Patent
Soffer et al.

(10) Patent No.: US 8,401,590 B2
(45) Date of Patent: Mar. 19, 2013

(54) COMBINED OMNI- AND DIRECTIONAL-COMMUNICATIONS IN HIGH-FREQUENCY WIRELESS NETWORKS

(75) Inventors: Menashe Soffer, Katzir (IL); Huaning Niu, Milpitas, CA (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 13/167,047

(22) Filed: Jun. 23, 2011

(65) Prior Publication Data

US 2011/0249615 A1 Oct. 13, 2011

Related U.S. Application Data

(62) Division of application No. 12/286,354, filed on Sep. 30, 2008, now Pat. No. 8,027,702.

(60) Provisional application No. 61/035,480, filed on Mar. 11, 2008.

(51) Int. Cl.
*H04M 1/00* (2006.01)
*H04B 7/02* (2006.01)

(52) U.S. Cl. ............. 455/562.1; 455/277.1; 370/254

(58) Field of Classification Search ......... 455/562.1
See application file for complete search history.

(56) References Cited

U.S. PATENT DOCUMENTS

| 5,276,907 | A | | 1/1994 | Meidan | |
|---|---|---|---|---|---|
| 5,557,612 | A | * | 9/1996 | Bingham | 370/449 |
| 5,894,598 | A | * | 4/1999 | Shoki | 455/562.1 |
| 5,960,350 | A | * | 9/1999 | Schorman et al. | 455/450 |
| 6,370,369 | B1 | * | 4/2002 | Kraiem et al. | 455/277.1 |
| 7,453,793 | B1 | * | 11/2008 | Jones et al. | 370/203 |
| 8,265,047 | B2 | * | 9/2012 | Qin et al. | 370/338 |
| 2003/0036408 | A1 | | 2/2003 | Johansson et al. | |
| 2004/0002363 | A1 | | 1/2004 | Cuffaro | |
| 2004/0185783 | A1 | * | 9/2004 | Okawa et al. | 455/63.4 |
| 2004/0196813 | A1 | | 10/2004 | Ofek et al. | |
| 2006/0172711 | A1 | * | 8/2006 | King et al. | 455/101 |
| 2006/0189355 | A1 | | 8/2006 | Cuffaro | |
| 2008/0026797 | A1 | | 1/2008 | Nanda et al. | |
| 2008/0095072 | A1 | * | 4/2008 | Shao et al. | 370/254 |

FOREIGN PATENT DOCUMENTS

| CN | 1663293 A | | 8/2005 |
|---|---|---|---|
| JP | 2000-114846 A | | 4/2000 |
| JP | 2000114846 A | * | 4/2000 |
| JP | 2002-100917 A | | 4/2002 |
| JP | 2007-133828 A | | 5/2007 |

(Continued)

OTHER PUBLICATIONS

Xiangping Qin, Chiu Ngo, Harkirat Singh, Huai-Rong Shao, ChangYeul Kweon, Guoping Fan, SeongSoo Kim, Cooperative Automatic Device Discovery for Wireless Networks with Directional Antennas, Sep. 2007, Samsung Electronics.*

(Continued)

*Primary Examiner* — Temesgh Ghebretinsae
*Assistant Examiner* — Gennadiy Tsvey
(74) *Attorney, Agent, or Firm* — Sutherland Asbill & Brennan LLP (57) ABSTRACT

In a wireless communication network, specific portions of the communication may combine directional transmission with omnidirectional reception. In particular, sector-level directional transmission may be established through sector sweeps, followed by antenna training for more directionality. In some embodiments, collisions during the exchange may be reduced by having different network devices use different sub-channels or different time slots. In some embodiments, each network may restrict its network communications to a single sub-channel that is different than the sub-channels used by adjacent networks.

15 Claims, 7 Drawing Sheets

FOREIGN PATENT DOCUMENTS

| | | |
|---|---|---|
| JP | 2008-167871 A | 7/2008 |
| TW | I249319 B | 2/2006 |
| WO | 2009/114628 A1 | 9/2009 |

OTHER PUBLICATIONS

International Search Report and Written Opinion received for PCT Patent Application No. PCT/US2009/036834, mailed on May 28, 2009, 7 pages.

International Preliminary Report on Patentability received for PCT Patent Application No. PCT/US2009/036834, mailed on Sep. 14, 2010, 5 pages.

Office action received for Korean Patent Application No. 10-2010-7020340, mailed on Jun. 27, 2011, 3 pages of Korean office action and 2 pages of English translation.

Office action for Japanese Patent Application No. 2010-547878, mailed on Oct. 25, 2011, 3 pages of Japanese office action and 4 pages of English translation.

Office Action received for Taiwan Patent Applicaiton No. 98107699, mailed on Aug. 3, 2012, 4 pages of Taiwan Office Action, 1 page of Search Report and 4 pages of Taiwan Office Action.

Office Action received for Chinese Patent Application No. 200910159506.6, mailed on Aug. 31, 2012, 8 pages of English Translation and 6 pages of Chinese Office Action.

\* cited by examiner

COMBINED OMNI- AND DIRECTIONAL-COMMUNICATIONS IN HIGH-FREQUENCY WIRELESS NETWORKS

CROSS REFERENCE TO RELATED APPLICATIONS

This application is a divisional application of U.S. non-provisional patent application Ser. No. 12/286,354, filed Sep. 30, 2008, which is in turn derived from U.S. provisional patent application Ser. No. 61/035,480, filed Mar. 11, 2008, and claims priority to those filing dates for all applicable subject matter.

BACKGROUND

High-frequency wireless communications, such as in the 60 GHz Wireless Personal Area Networks currently being developed, tend to be limited to short-range communications because of the level of absorption of the signals by oxygen in the air. For this and other reasons, this technology is most suitable for personal area networks that have multiple devices communicating with each other within a small area. In many applications, this will lead to a dense operating environment, in which multiple such networks that are adjacent and overlapping will tend to interfere with each other. To reduce the level of this interference, communications tend to be directional and prescheduled. But some communications, by their very nature, need to be omnidirectional and unscheduled. Choosing one or the other usually requires trading off the advantages and disadvantages of each.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. Each wireless network device will comprise at least a wireless transmitter, a wireless receiver, and a processor.

In various embodiments, directional transmission may be combined with omnidirectional reception during device discovery and during bandwidth requests to achieve high gain and reduce interference with other devices. For the purposes of this document, omnidirectional reception refers to receiving a signal with an antenna in which signals of similar strength at the location of the antenna will be received with similar apparent strength from any part of the 360 degree coverage area of the antenna. Directional transmission refers to an antenna system with which transmitted signals will be stronger in a particular direction than in the other directions. In some embodiments, each network in a multi-network environment will combine this approach with using a narrow sub-channel, different than the sub-channel used by adjacent networks, to further reduce interference between networks. In other embodiments, different sub-channels or different time slots may be used by individual mobile devices within a network during a contention period to reduce the chance of collisions during that period.

Figure 1:
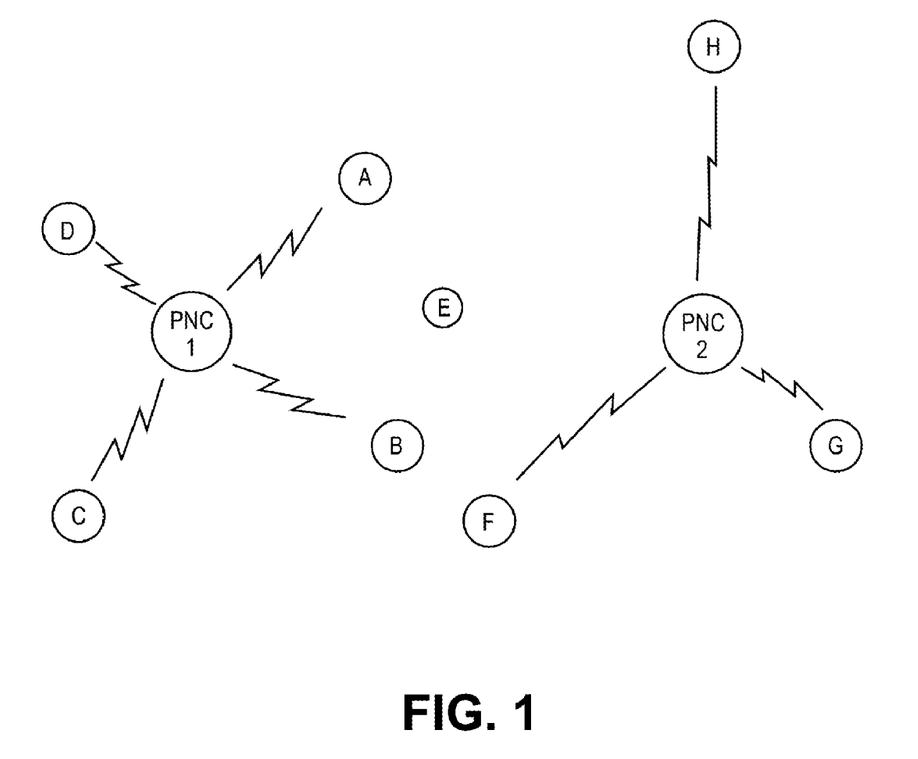
FIG. 1 shows multiple wireless networks, according to an embodiment of the invention.

FIG. 1 shows multiple wireless networks, according to an embodiment of the invention. Within the context of this document, every wireless network is considered to comprise a wireless network controller and one or more other wireless devices that are associated with the controller and whose communications may be mostly scheduled by the controller. For convenience of reference within this document, each network may be referred to as a piconet (which typically may operate at or near the 60 GHz band), each network controller may be referred to as a PNC, and each of the other network devices may be referred to as a DEV, as that terminology is already common in piconet technology. However, the use of those terms in this document should not be construed as limiting the embodiments of the invention to piconets, or to devices that are labeled as PNC or DEV, unless those limitations are specifically claimed.

In the illustrated example, a first network includes a piconet controller PNC1, and four DEV's A, B, C, and D associated with PNC1. The second network includes piconet controller PNC2, and three DEV's F, G, and H associated with PNC2. Another DEV E is currently not associated with either PNC, but could presumably become associated with either PNC because of its proximity to both PNC's.

Any or all of the wireless devices PCN1, PCN2, and A-H may contain a battery to provide operational power to the device. Also, any or all of the wireless devices PNC1, PNC2, and A-H may have multiple antennas for directional communication. Such directionality may be achieved by combining the multiple antennas into a phased array antenna system, in which each antenna is substantially omnidirectional by itself, but directionality may be achieved by processing the separate signals to or from each antenna in a manner that achieves directionality for the overall antenna array. For omnidirectional communications with a phased array antenna system, a single antenna may be selected for transmission or for reception, while the other antennas in the array may be turned off or otherwise not used for that purpose.

For coarse directionality, the normal 360 degree coverage of omnidirectional communications may be divided into a given number of adjacent sectors. Each transmission may be relatively strong in a given sector, while being relatively weak in all the other sectors. The processing parameters for such coarse, sector-level, directionality may be pre-programmed into the device. For fine directionality, with its resulting higher gain, a subsequent antenna training session between two devices may be required. For convenience of reference, each sector may be described in terms of the device doing the transmitting. For example, controller sectors are sectors defined by the network controller for transmissions from the network controller, and DEV sectors are sectors defined by a DEV for transmissions from the DEV.

Figure 2:
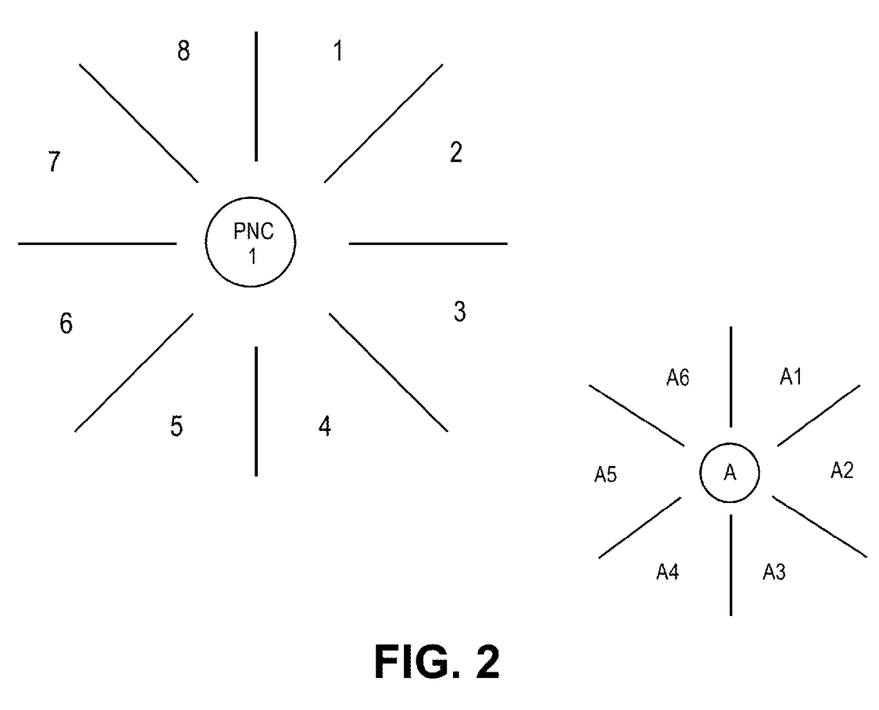
FIG. 2 shows sectorized directional transmission from each of two network devices, according to an embodiment of the invention.

FIG. 2 shows sectorized directional transmission from each of two network devices, according to an embodiment of the invention. The example shows eight sectors for transmissions from PNC 1 (labeled 1-8), and six sectors for transmissions from DEV A (labeled A1-A6 to distinguish them from the sectors of the PNC), but other quantities may also be used in either device. As an example of sectorized transmissions, a DEV A that lies within PNC 1's sector 3 (as shown in FIG. 2) may be able to receive a strong signal while the PNC is transmitting in sector 3, but may receive a relatively weak, or even undetectable, signal while the PNC is transmitting in any other sector. Similarly, if PNC 1 lies within DEV A's sector A5 (as shown in FIG. 2), then PNC 1 may be able to receive a strong signal while DEV A is transmitting in sector A5, but may receive a relatively weak, or even undetectable, signal while DEV A is transmitting in any other sector. If a receiving device is located near the border between two adjacent sectors of the transmitting device, it might be able to receive a usable signal from either sector, although one would probably be stronger than the other.

A sector sweep transmission is a technique in which the same basic information is transmitted in each individual sector at separate times, until that basic information has been transmitted in all the sectors. The sectors may typically be selected in sequential order, either clockwise or counter-clockwise, but other orders of selection may also be used. Although the same basic information is transmitted in each sector during a sector sweep, there may be minor differences in that information. For example, the transmission may contain the identification of the sector currently being used, so that receiving devices will know which of the transmitter's sectors provide them with the best signal. Timing information, if included, may also be different for each sector, since each is transmitted at a different time.

Figure 3:
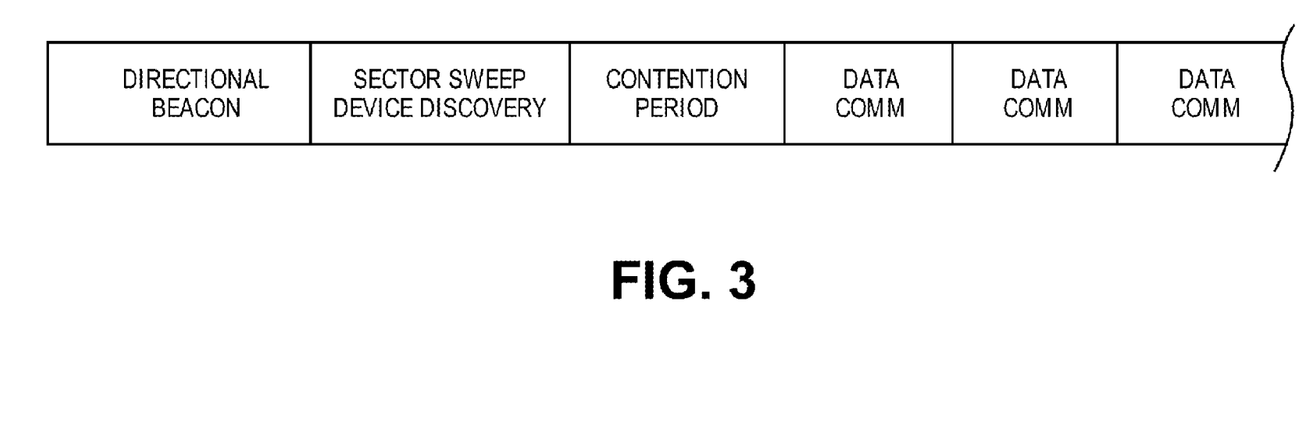
FIG. 3 shows a frame structure, according to an embodiment of the invention.

FIG. 3 shows a frame structure, according to an embodiment of the invention. Although particular parts of the frame are shown in a particular order, other embodiments may contain more, fewer, and/or different parts, and the order may be different. The parts shown are general in nature, and may contain additional detail not shown, such as headers, information elements, interframe spaces, etc. In the illustrated example of FIG. 3, one or more directional beacons may be transmitted by the PNC near the beginning of the frame. This beacon may be addressed to those devices that are already associated with the PNC. Since directional communication with these devices has already been established in previous frames, the beacons may be transmitted directionally, using either sector directionality or fine directionality. In some embodiments, a multicast addressing format may be used if multiple receiving devices can be reached by the same directional transmission.

Next, a device discovery process may be implemented to discover new devices that wish to join this network. Since the PNC does not know in which direction these potential network devices might be located, the discovery beacon(s) should be transmitted in all horizontal directions. Rather than transmitting a discovery beacon as a single omnidirectional transmission, this may be accomplished with a sector sweep, by transmitting the discovery beacon at a separate time for each sector. Each of these separate transmissions may contain the identification of the sector that the transmission covers. In addition to identifying new devices for the network, the device discovery period may also be used to gather information about the direction of these new devices so that subsequent transmissions to/from them may be directional. A more detailed description of the contents of the sector sweep device discovery part is presented later.

A contention period may follow the sector sweep device discovery portion of the frame. During the contention period, DEV's may transmit to the PNC without being pre-scheduled to do so, by simply transmitting when the channel appears to be idle. However, if more than one DEV is transmitting at the same time, a collision may occur, causing one or both signals to be received incorrectly by the PNC. Various techniques may be used to reduce, and/or recover from, the collisions that may result from this method. For example, each device may use one of multiple available sub-channels. By using different sub-channels, each device's transmission may be simultaneously received by the PNC without interference. In another example, the contention period may be divided into multiple pre-defined time slots, and each device may use a particular time slot for its transmission. In some embodiments, the device will randomly select which sub-channel or time slot it will use for transmission. Using either the sub-channel or time slot technique, it is still possible that both devices will select the same sub-channel, or the same time slot, and interference will still occur. But the chances of such interference are greatly reduced by either of these techniques. Of course, if a collision does occur, causing incorrect reception of one or both transmissions, any of various techniques may be used to retransmit the information.

During the contention period, the PNC and DEV's may exchange additional information that can improve the directionality of subsequent communications between them. For example, the devices may perform antenna training to achieve fine directionality during this period. The mobile devices may also each perform bandwidth requests during this period to reserve one or more subsequent time periods for communications with the PNC during the Data Comm portion of the frame.

Following the contention period, data may be exchanged between the PNC and the various DEV's that are associated with it, following a schedule issued by the PNC (which may be based at least partly on the aforementioned bandwidth requests in previous frames). These periods are labeled Data Comm in the drawing. Because of the information on directionality that was determined earlier, all or most of this scheduled communication may use direction transmissions and either directional or omnidirectional receptions, by both the PNC and by the DEV's.

Figure 4:
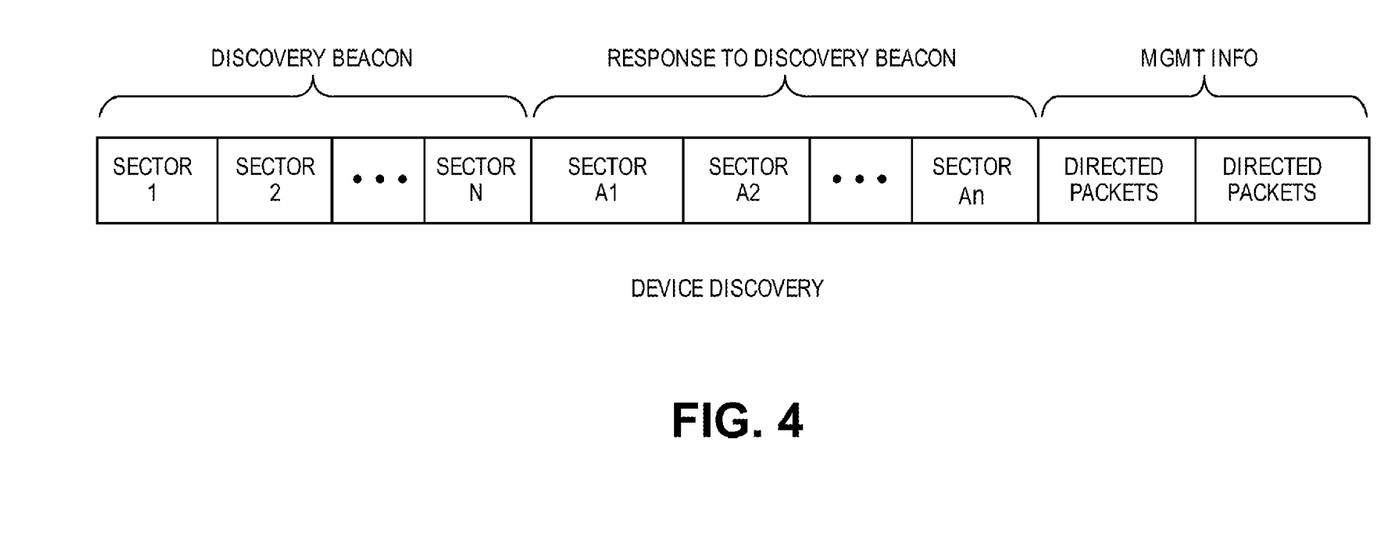
FIG. 4 shows contents of the sector sweep device discovery period of FIG. 3, according to an embodiment of the invention.

FIG. 4 shows contents of the sector sweep device discovery period of FIG. 3, according to an embodiment of the invention. The illustrated embodiment includes three portions, although other embodiments may contain more or fewer than three. The first portion includes the discovery beacon transmitted by the PNC, using the sector sweep technique. For example, the PNC may directionally transmit the discovery beacon to sector 1, then directionally transmit the discovery beacon to sector 2, then sector 3, etc., until all the sectors have been covered. Each discovery beacon may also include other information, such as the identity of the particular sector that is being covered at that time. During this portion, the PNC may use a directional transmission for each sector. Any DEV's that are looking for a discovery beacon may use omnidirectional reception, since they won't know in advance which direction a beacon will come from.

Following the first portion, the second portion may be used to give DEV's a chance to respond to the beacon. The response of a single DEV A is shown. In a conventional system, the response would be transmitted omnidirectionally by the DEV. However, since we wish to obtain directional information for use with subsequent communications, the response may use a sector sweep approach. The DEV may transmit the response directionally to sector A1, then transmit the response directionally to sector A2, then sector A3, etc., until all the sectors have been covered. The sectors of the mobile device A are each identified with an "A" prefix before the sector number (A1 through An) to distinguish them from the sectors 1 through N that are used by the PNC. The number of sectors used by the PNC may or may not be the same as the number of sectors used by the DEV.

The response of DEV A may contain several pieces of information, such as but not limited to: 1) a request to become associated with the PNC, 2) the identity of the responding DEV, 3) the sector number of the DEV that this particular response is being transmitted to (remember, a separate response is transmitted for each sector), 4) the PNC sector number that was contained in the beacon that this DEV is responding to, 5) etc. If the DEV was able to receive the discovery beacon in more than one PNC sector, the DEV may specify which of those PNC sectors it prefers (typically the sector that contained the best quality signal, as determined by signal strength and/or signal-to-noise ratio, though other criteria may be used).

In the third portion of the device discovery period, labeled Mgmt Info (Management Information) in the drawing, the PNC may communicate additional information to the DEV. Since the DEV informed the PNC during the second portion as to which PNC sector should be used for transmissions to the DEV, all transmissions to the DEV during the third portion may be directional transmissions, using the indicated PNC sector. The information communicated to the DEV during the third portion may include the DEV sector number that the DEV should subsequently use when transmitting to the PNC. If the PNC only received the response in one sector, then this is the sector that should be specified. If the PNC received the response in more than one sector from the DEV, then it can select the best sector for the DEV to use, using criteria similar to that described in the previous paragraph.

After receiving this information on sector number, the DEV may subsequently use that sector for directional transmissions to the PNC. The PNC and DEV may also exchange other information during the third period, and may both use directional transmissions for the remainder of the third period. These directional transmissions may also be used for subsequent communications between these two devices, using the sector numbers specified during the device discovery period. However, after antenna training has been performed later to achieve fine directionality, the parameters for fine directionality may be used instead of those for the coarse sector-level directionality.

Because some network devices may sometimes be moved during operation, thus changing the optimal selection of sectors, the process for sector determination may sometimes need to be repeated, even though the device discovery process is not being invoked. In this case, sector sweeps may be performed external to the device discovery phase. This reselection of sectors may be triggered by any of several events, such as but not limited to: 1) sector selection may be repeated at predetermined intervals, 2) when the signal quality falls below a certain threshold for a predetermined period of time, 3) when communication is completely interrupted, 4) when a predetermined external event occurs, 5) etc.

Figure 5:
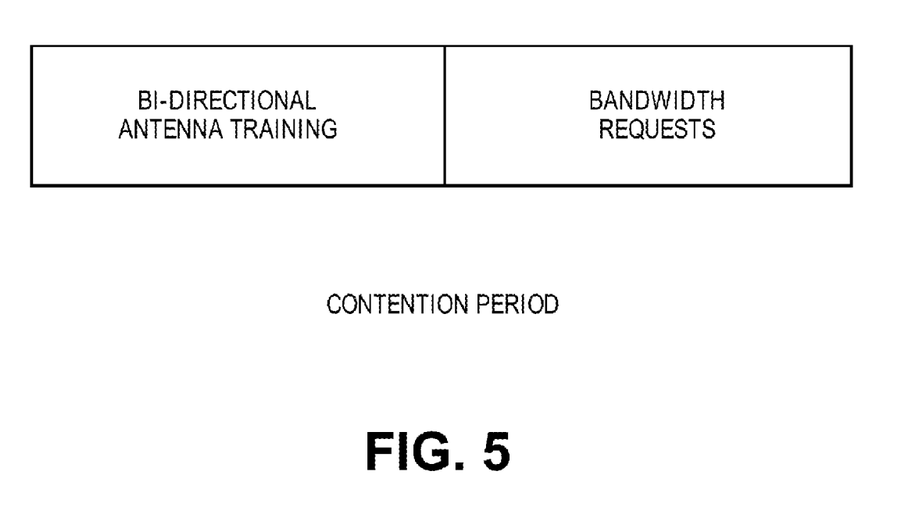
FIG. 5 shows contents of the contention period of FIG. 3, according to an embodiment of the invention.

FIG. 5 shows contents of the contention period of FIG. 3, according to an embodiment of the invention. The illustrated embodiment includes two portions, although other embodiments may contain a different quantity of portions. The first portion includes bi-directional antenna training sequences. By the beginning of the contention period, each newly-associated DEV in the network has already exchanged sector information with the PNC, so coarse directional communication within the granularity of a single sector is possible. However, for higher gain and potentially higher data rates, fine directionality (i.e., a narrower beam) may be necessary. Antenna training may be required to achieve this, in which each device transmits predetermined data patterns to the other device. Using various signal processing techniques, each device can derive which parameters to use for transmission, and for reception, to achieve the desired narrow beam results. These two devices may then use these parameters in subsequent communications. If one or both devices is moved, new antenna training may be required to determine new parameters. Various antenna training techniques are known, and are not discussed here in more detail.

The second portion of the illustrated contention period may be used for bandwidth requests. In a bandwidth request, the DEV requests that a portion of time be reserved for the DEV to communicate with the PNC. The PNC then schedules a certain time period for such communication, making sure that it does not conflict with other time periods scheduled for other DEV's, and transmits this schedule back to the DEV. This scheduled period may fall within the Data Comm part of FIG. 3. Various techniques for scheduling dedicated periods of communication are known and are not discussed here in more detail.

Figure 6:
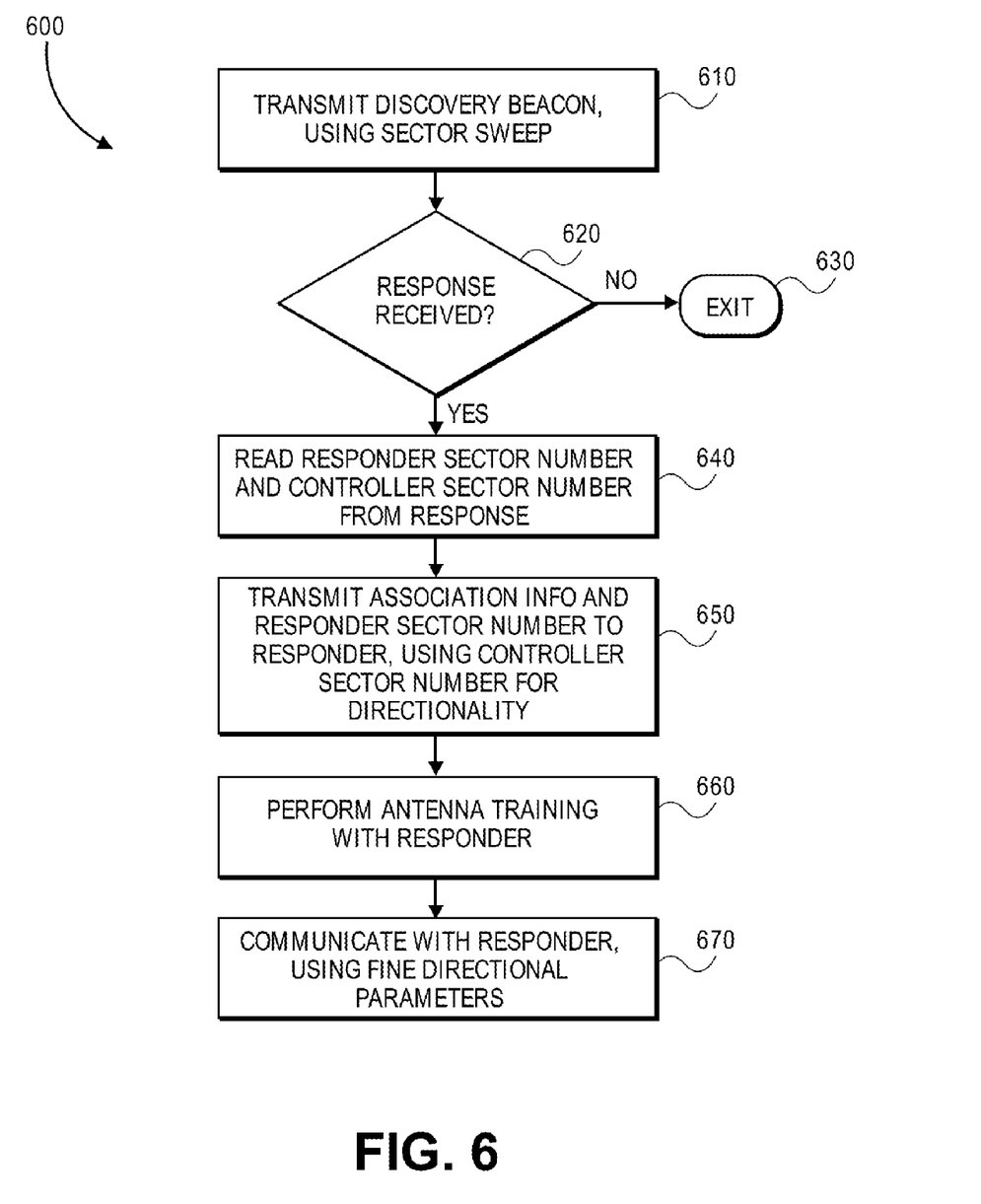
FIG. 6 shows a flow diagram of a method of achieving directional communications by a wireless network controller, according to an embodiment of the invention.

FIG. 6 shows a flow diagram of a method of achieving directional communications by a wireless network controller, according to an embodiment of the invention. In the illustrated embodiment of flow diagram 600, at 610 the PNC transmits a discovery beacon, using the sector sweep techniques described previously to directionally transmit the beacon at separate times in each of multiple sectors. The beacon to each sector will include the sector number of that sector, as the sector numbers are defined by the PNC. Note: the term "sector number", as used herein, includes any type of sector identifier, whether or not the identifier is an actual number.

After performing the sector sweep, at 620 the PNC may go to omnidirectional reception to monitor for a response to the discovery beacon from a DEV wishing to join (or rejoin) the network. If no response is received within the prescribed amount of time, the PNC may exit this flow diagram at 630, and continue performing the operations it would normally perform, operations that are not further described here. However, if a response is received, the PNC may read the contents of the response at 640, those contents including the responder sector number (i.e., the sector that the responding DEV was transmitting in when it transmitted this response), and the controller sector number (i.e., the sector number that was identified in the discovery beacon that this response is responding to). The network controller may then use this controller sector number for subsequent directional transmissions to this DEV.

To permit the responding DEV to associate with the network controller, at 650 the PNC may transmit various association information to the DEV. The nature of much of this information is well established and is not further described here. However, unlike conventional systems, the PNC may also transmit the responder sector number that was read from the response. By transmitting the identity of this sector, the PNC is telling the responding DEV which sector to use for subsequent directional transmissions to the PNC. The association information and the responder sector number may be transmitted directionally, using the controller sector number that was read from the response.

At this point, both the network controller and the DEV know which of their respective sectors to use for directional transmissions to each other. However, further antenna training may be necessary to achieve directionality that is narrower than a sector. The PNC and the DEV may perform this antenna training at 660. Further communications between them may then be performed with a narrow beam at 670, using the fine directional parameters established during antenna training.

Figure 7:
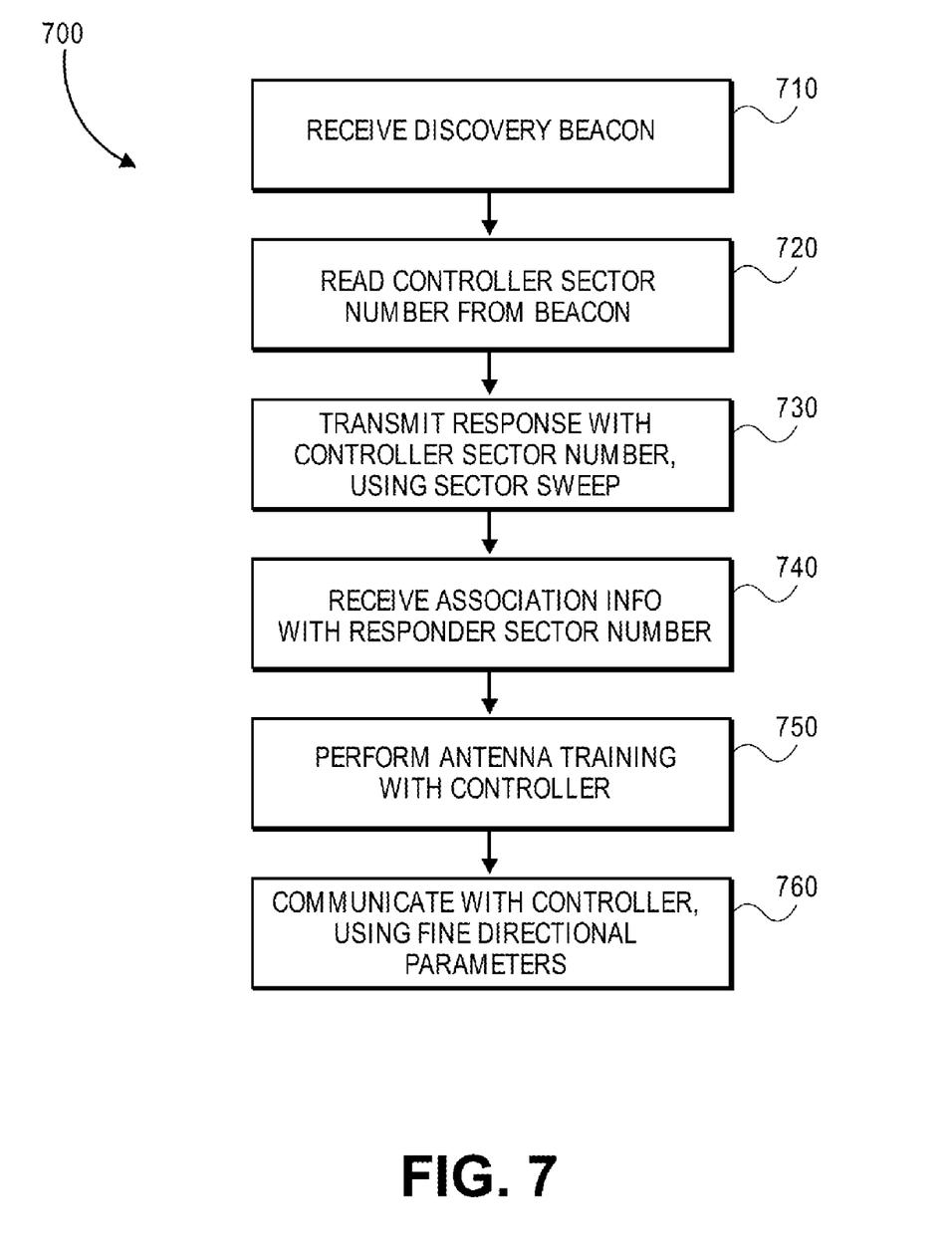
FIG. 7 shows a flow diagram of a method of achieving directional communications by a non-controller wireless device in a network, according to an embodiment of the invention.

FIG. 7 shows a flow diagram of a method of achieving directional communications by a non-controller wireless device in a network, according to an embodiment of the invention. In the illustrated embodiment of flow diagram 700, at 710 a DEV may use omnidirectional reception techniques to receive a discovery beacon from a PNC. The DEV may then read the controller sector number from the received beacon at 720. The DEV may then respond to the beacon at 730 by transmitting a request to associate with the PNC, using the sector sweep techniques described previously to directionally transmit the response at separate times in each of multiple sectors. The transmission to each sector will include the DEV sector number of that sector, as the sector numbers are defined within the DEV. Subsequently, using omnidirectional reception techniques, at 740 the DEV may receive information from the PNC pertaining to associating with the PNC, along with the DEV sector number to use in subsequent transmissions to the PNC At this point, both the DEV and the PNC have the information needed to perform coarse directional transmissions at the sector level when communicating with each other. But to be capable of achieving fine directional transmissions and fine directional receptions, antenna training may be performed between the two devices at 750. After such training, subsequent communications between the two devices may use the parameters for fine directional communications, as indicated at 760.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A method, comprising
performing operations in a first wireless network device, the operations comprising:
directionally transmitting, within a first sector, a first discovery beacon including a first sector number identifying the first sector;
directionally transmitting, within a second sector, a second discovery beacon including a second sector number identifying the second sector;
omnidirectionally receiving a response to one of the first and second discovery beacons from a second wireless network device, the response including a particular one of the first and second sector numbers, the response further including a third sector number identifying a third sector used by the second wireless network device to transmit the response; and
directionally transmitting information to the second wireless network device using the sector identified by the particular one of the first and second sector numbers, the information including the third sector number.

2. The method of claim 1, the operations further comprising performing antenna training with the second wireless network device.

3. The method of claim 1, wherein said receiving the response comprises receiving the response over one of multiple available sub-channels.

4. The method of claim 1, wherein said receiving the response comprises receiving the response during one of multiple available time slots.

5. The method of claim 1, wherein said performing the operations comprises performing the operations within a piconet network.

6. An apparatus, comprising
a first wireless network device containing a wireless transmitter, a wireless receiver, and a processor, the first wireless network device to:
directionally transmit, within a first sector, a first discovery beacon including a first sector number identifying the first sector;

directionally transmit, within a second sector, a second discovery beacon including a second sector number identifying the second sector;

omnidirectionally receive a response to one of the first and second discovery beacons from a second wireless network device, the response to include a particular one of the first and second sector numbers, the response to further include a third sector number identifying a third sector used by the second wireless network device to transmit the response; and directionally transmit information to the second wireless network device using the sector identified by the particular one of the first and second sector numbers, the information including the third sector number.

7. The apparatus of claim 6, wherein the first wireless network device is to perform antenna training with the second wireless network device.

8. The apparatus of claim 6, wherein the first wireless network device is to receive the response over one of multiple available sub-channels.

9. The apparatus of claim 6, wherein the first wireless network device is to receive the response during one of multiple available time slots.

10. The apparatus of claim 6, wherein the first and second wireless network devices are to operate within a piconet network.

11. The apparatus of claim 6, wherein the first wireless network device comprises multiple antennas in a phased array antenna system.

12. An article comprising
a tangible machine-readable medium that contains instructions, which when executed by one or more processors result in performing operations comprising:

directionally transmitting, within a first sector, a first discovery beacon including a first sector number identifying the first sector;

directionally transmitting, within a second sector, a second discovery beacon including a second sector number identifying the second sector;

omnidirectionally receiving a response to one of the first and second discovery beacons from a second wireless network device, the response including a particular one of the first and second sector numbers, the response further including a third sector number identifying a third sector used by the second wireless network device to transmit the response; and directionally transmitting information to the second wireless network device using the sector identified by the particular one of the first and second sector numbers, the information including the third sector number.

13. The medium of claim 12, wherein the operations further comprise performing antenna training with the second wireless network device.

14. The medium of claim 12, wherein the operation of receiving the response comprises receiving the response over one of multiple available sub-channels.

15. The medium of claim 12, wherein the operation of receiving the response comprises receiving the response during one of multiple time slots available for the response.

* * * * *